May 20, 1969          K. W. McLOAD          3,445,809
GEOPHONE HOUSING AND TAKE-OUT
Original Filed Jan. 23, 1967
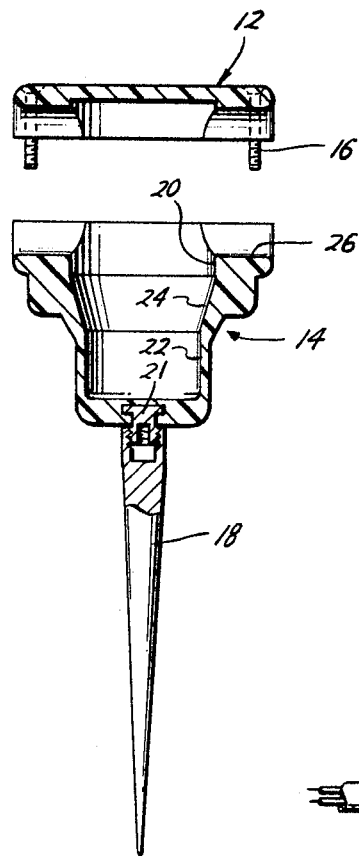
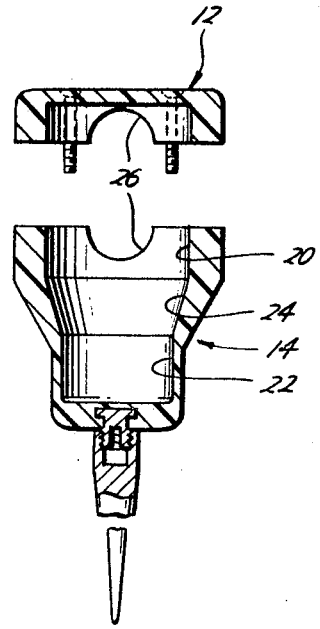
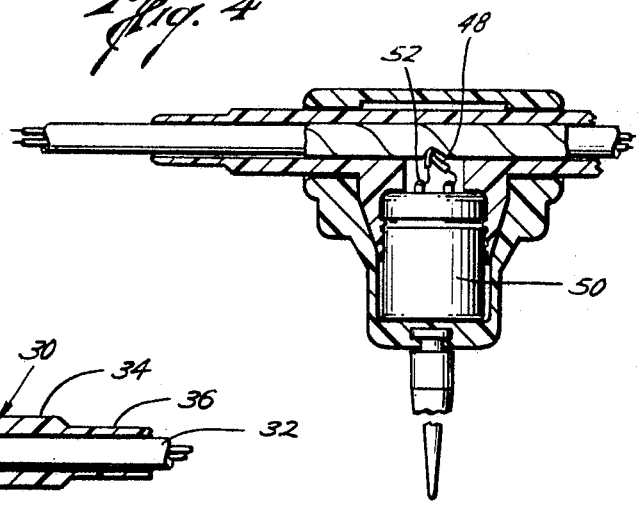
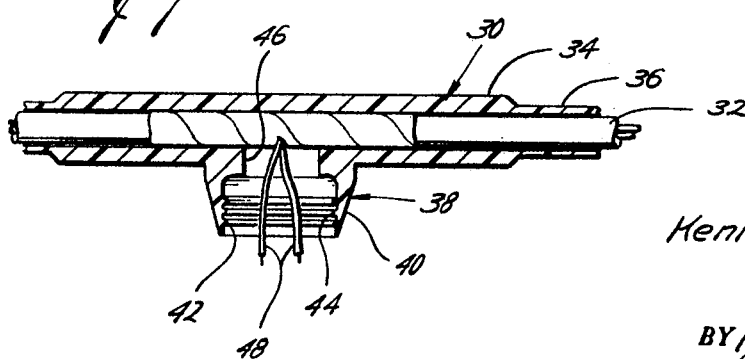
Kenneth W. McLoad
INVENTOR
BY John E. Holder
ATTORNEY

United States Patent Office 3,445,809
Patented May 20, 1969

3,445,809
GEOPHONE HOUSING AND TAKE-OUT
Kenneth W. McLoad, Houston, Tex., assignor to Schlumberger Technology Corporation, Houston, Tex., a corporation of Texas
Continuation of application Ser. No. 610,891, Jan. 23, 1967. This application July 12, 1968, Ser. No. 752,437
Int. Cl. G01v 1/16
U.S. Cl. 340—17                                      6 Claims

ABSTRACT OF THE DISCLOSURE

A geophone case is constructed to provide a fluid-tight environment for a geophone. The inside of the geophone case has an annular inwardly sloping surface which forms a seat for sealingly engaging a complementary surface on a rubber take-out molded about a seismic cable. The molded rubber take-out has an interior cup portion for receiving a geophone therein. Sealing ribs are provided in the interior cup portion where it engages the geophone to provide a further fluid seal. A ground spike is threadedly attached to the geophone case but does not intersect the interior of the geophone case.

---

This application is a continuation of application Ser. No. 610,891, filed Jan. 23, 1967, and now abandoned.

BACKGROUND OF THE INVENTION

This invention relates to a geophone housing and take-out and, more particularly, to a geophone housing and take-out which provide a fluid-tight environment for the geophone.

In the exploration for oil, seismic detector spreads are often placed in marshy areas and, therefore, subjected to substantial amounts of moisture. It is, therefore, important under such conditions to provide a waterproof geophone housing. In addition, it is desirable that the detectors or transducers positioned in the housing be readily removable from the housing so that in the event one of the detectors becomes faulty or needs to be replaced, ready access to the detector is permissible. In some instances, the construction of geophone housings requires that the seismic cable or portions thereof be twisted, knotted or bent to facilitate attachment of the geophone housing. Such bending, etc., causes stress in wire conductors embedded therein which may in turn cause the conductors to break.

It is, therefore, an object of the present invention to provide a new and improved geophone housing and take-out which seals the geophone against moisture and which permits ready access to the geophone in the field.

SUMMARY OF THE INVENTION

With these and other objects in view, the present invention includes a molded geophone case. The interior of the case has an annular inwardly and downwardly sloping wall which forms a seat. The seat sealingly receives a complementary surface on a molded rubber cup formed on a cable take-out. The cup has an interior chamber for receiving the upper end of a detector or geophone. The interior chamber of the rubber cup has ribs molded therein for sealingly engaging the outer wall of the detector to provide a fluid-tight seal therebetween. The rubber cup is pressed into the geophone case to force moisture sealing surfaces together and is held in place by an upper portion of the case which is attached to a lower portion of the geophone case.

The novel features of the present invention are set forth with particularity in the appended claims. The present invention, both as to its organization and manner of operation together with further objects and advantages thereof, may best be understood by way of illustration and example of an embodiment when taken in conjunction with the accompanying drawings.

BRIEF DESCRIPTION OF THE DRAWINGS

FIGURE 1 shows an elevational view in cross section of a geophone case embodying the principles of the present invention;

FIGURE 2 shows an end view in cross section of the geophone case with an opening therein for receiving a cable;

FIGURE 3 shows a molded take-out positioned about a cable; and

FIGURE 4 shows an elevational cross sectional view of a geophone case assembled about a take-out and a detector positioned within the case.

DESCRIPTION OF THE PREFERRED EMBODIMENTS

Referring first to FIGURE 1, a molded plastic geophone case is shown having upper and lower housing member or portions 12 and 14, respectively, which may be assembled to one another by means of screws 16 or the like. A threaded stud 21 is molded in the lower end of the lower portion 14 but does not intersect the interior wall of the base. It is noted that the stud has external and internal threads. This arrangement permits attachment of a large metal ground spike 18 as shown in FIGURE 1 or the attachment to the inner threads of a more pointed spike (not shown) for use in hard ground. The interior of the lower portion of the case has an upper enlarged bore 20 and a lower smaller bore 22 with the bores being connected by a downwardly and inwardly sloping frusto-conical wall portion or seat 24.

FIGURE 2 shows a cross-sectional end view of the molded geophone case. Semi-circular openings 26 are formed in the upper and lower portions of the case to provide a circular opening, when assembled, for receiving a seismic cable and geophone take-out therein.

Referring next to FIGURE 3, a rubber geophone take-out 30 is shown molded about a conductor carrying cable 32. The molded take-out includes large and small diameter portions 34, 36, respectively, received about the conductor and a depending molded rubber cup 38. The rubber cup has an outer frusto-conical surface 40 which slopes inwardly and downwardly at its lower end. A bore 42 is formed in the interior of the cup for receiving a seismic detector or geophone therein. Circumferential extending annular ribs 44 are formed on the wall of the interior bore 42 of the cup 38. The upper end of the interior bore 42 has a smaller bore 46 extending upwardly therefrom into communication with the conductor cable 32 within the molded take-out. The bore 46 provides a means for receiving conductor leads 48 which connect the detector with the conductors in the cable 32.

FIGURE 4 shows the detector case assembled with the geophone take-out. The assembly provides a waterproof environment and also easy accessibility to the detector. The molded plastic case provides an insulation of the detector from the ground. In arranging the assembly, the leads 48 extending from an interruption in the cable 32 are connected by means of solder or the like to terminals 52 extending from a detector 50. The detector 50 is then positioned in the interior bore 42 of the rubber cup, with the ribs 44 therein snugly engaging the outer periphery of the detector. This subassembly is then positioned in the lower portion 14 of the geophone case, with the outer sloping surface 40 of the cup engaging the interior frusto-conical seat 24 of the geophone case. The upper portion 12 of the case is then placed on top of the subassembly and attached thereto by means of screws 16. As the upper portion 12 of the case is assembled, pressure is applied to the take-out causing the sloping surface 40 of the rubber cup to be forced against the sloping interior seat 24 of the geophone case and to flex toward the outer surface of the detector 50. This construction causes the ribs 44 formed in the interior bore of the take-out cup 38 to sealingly engage the outer surface of the detector and thereby prevent any moisture, which may enter the interior of the case, from reaching the terminals and lead-in wires at the upper end of the detector. The compressed fit of the outer surface 40 of the molded take-out cup 38 with the interior sloping seat 24 of the detector case also provides a sealing surface against moisture. It is also noted that the large diameter portion 34 of the take-out, which surrounds the conductor cable, is also large with respect to the openings 26 in the detector case. Therefore, when the upper and lower portions 12 and 14 of the detector case are secured together, the case is force fitted about the rubber take-out to provide another sealing surface to prevent the encroachment of moisture within the assembled case.

It is readily seen that the reverse procedure of assembling the above-described geophone device will permit convenient access to the detector for replacement or repair in the field. In addition to the moisture sealing advantages of the described geophone device, the straight line construction of the conductor cable and take-out prevents the inherent disadvantages of bending or knotting of the conductor cable.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A moisture-proof enclosure for a geophone or the like connected to a cable extending through the enclosure, comprising: upper and lower housing members adapted for connection to each other about the cable, one of said housing members having a chamber adapted to receive a geophone, the other of said members being adapted to enclose said chamber, said one housing member having an annular tapered seating surface intersecting said chamber to form a frusto-conical recess surrounding the geophone; and an elastomeric take-out fitting carried by the cable for enabling electrical connection between the geophone and the cable, said fitting being received in said housing members and having a frusto-conical sealing portion with an internal bore sized to fit over the geophone, said sealing portion being forcefully fitted in said recess upon connection of said housing members to each other about the take-out fitting, thereby preventing moisture from entering said chamber.

2. The combination recited in claim 1, said bore of said sealing portion being provided with annular ribs arranged for sealing engagement with the geophone.

3. The combination recited in claim 1, said take-out fitting including members extending transversely of said sealing portion and surrounding the cable within said housing members and along a portion of its length outside said housing members to prevent undue flexure of the cable within said housing members.

4. An elastomeric take-out fitting for use in making an electrical connection between a geophone and conductor wires in a cable, said cable having an interruption exposing said conductor wires to the exterior of said cable, comprising: a body member having a tubular portion surrounding a length of said cable and sealingly enclosing said length of said cable on either side of said interruption, said body member having a generally frusto-conical portion with a bore opening outwardly from said interruption, said bore being sized and adapted to fit over a geophone in close contacting leak-proof relation, said frusto-conical portion having its outer surface inclining outwardly of said cable and inwardly toward said bore.

5. The take-out means of claim 4 wherein wall surfaces of said bore are provided with inwardly extending annular ribs.

6. A moisture-proof enclosure for a transducer which is adapted for electrical connection to a conductor cable, comprising: first and second housing members adapted to be assembled about the cable, one of said housing members having an internal chamber sized to receive the transducer, said one member having a tapered seat intersecting said chamber, and means for sealing said housing members against entry of moisture thereinto, said sealing means including an elastomeric fitting on the cable, said fitting having a longitudinal portion surrounding a length of the cable and sealingly engaging between the cable and said housing members, and a flexible portion extending transversely relative to said longitudinal portion and adapted to close said chamber, said flexible portion having an outer surface engageable with said tapered seat and movable relative to said tapered seat during assembly of said housing members about the cable to effect radially inward movement of said flexible portion into sealing relation about a transducer.

References Cited

UNITED STATES PATENTS

| | | | |
|---|---|---|---|
| 2,161,145 | 6/1939 | Du Pree et al. | 174—65 |
| 2,788,513 | 4/1957 | Howes | 340—17 |
| 2,908,890 | 10/1959 | Campbell et al. | 340—17 |
| 3,119,978 | 1/1964 | Sears | 340—17 |
| 3,258,739 | 6/1966 | Hurley et al. | 340—17 X |

RODNEY D. BENNETT, Jr., *Primary Examiner.*

DANIEL C. KAUFMAN, *Assistant Examiner.*

U.S. Cl. X.R.

174—50.54, 65